Jan. 30, 1923.
C. BOLLINGER.
DRAFT GAUGE.
FILED SEPT. 11, 1919.
1,443,785.
2 SHEETS—SHEET 2.
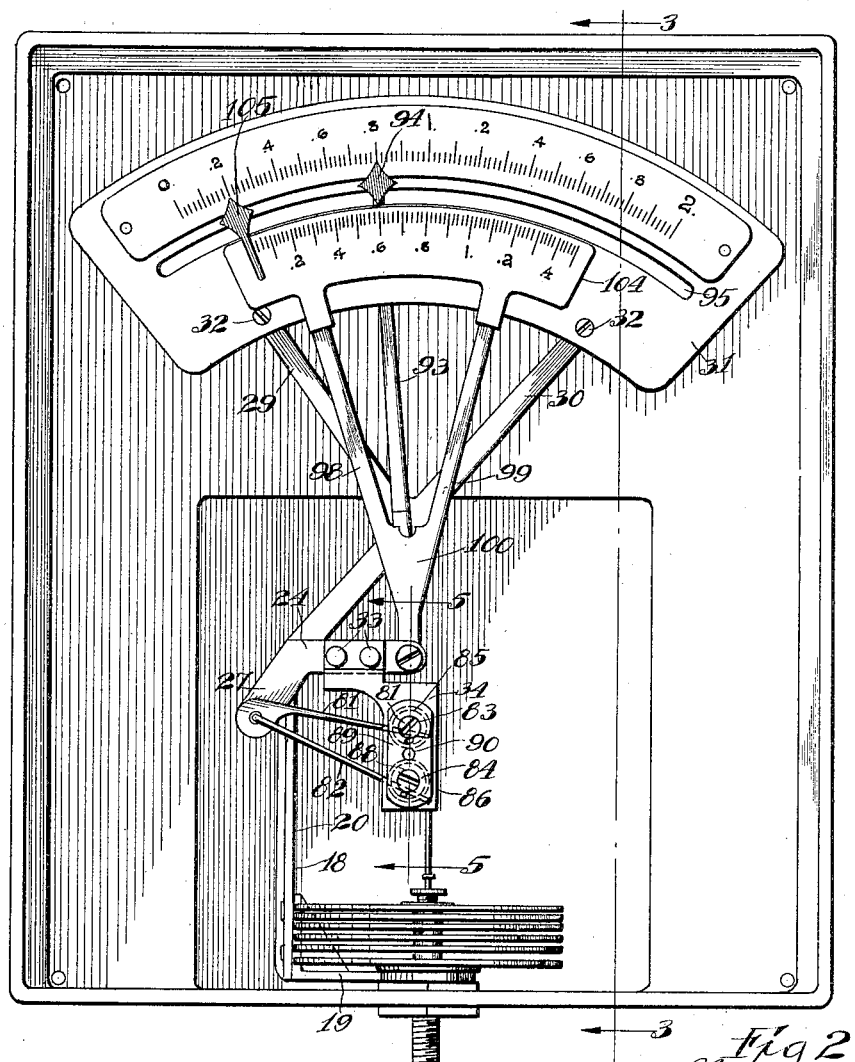
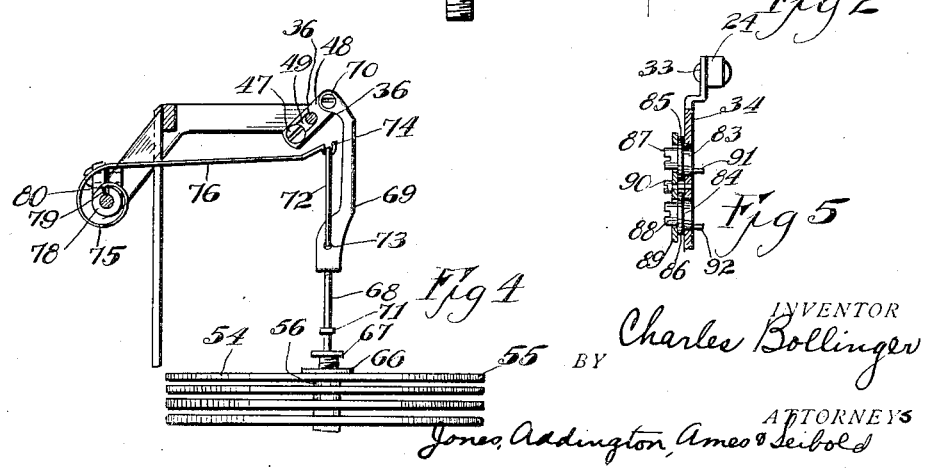
INVENTOR
Charles Bollinger
BY
Jones, Addington, Ames & Seibold
ATTORNEYS Patented Jan. 30, 1923.

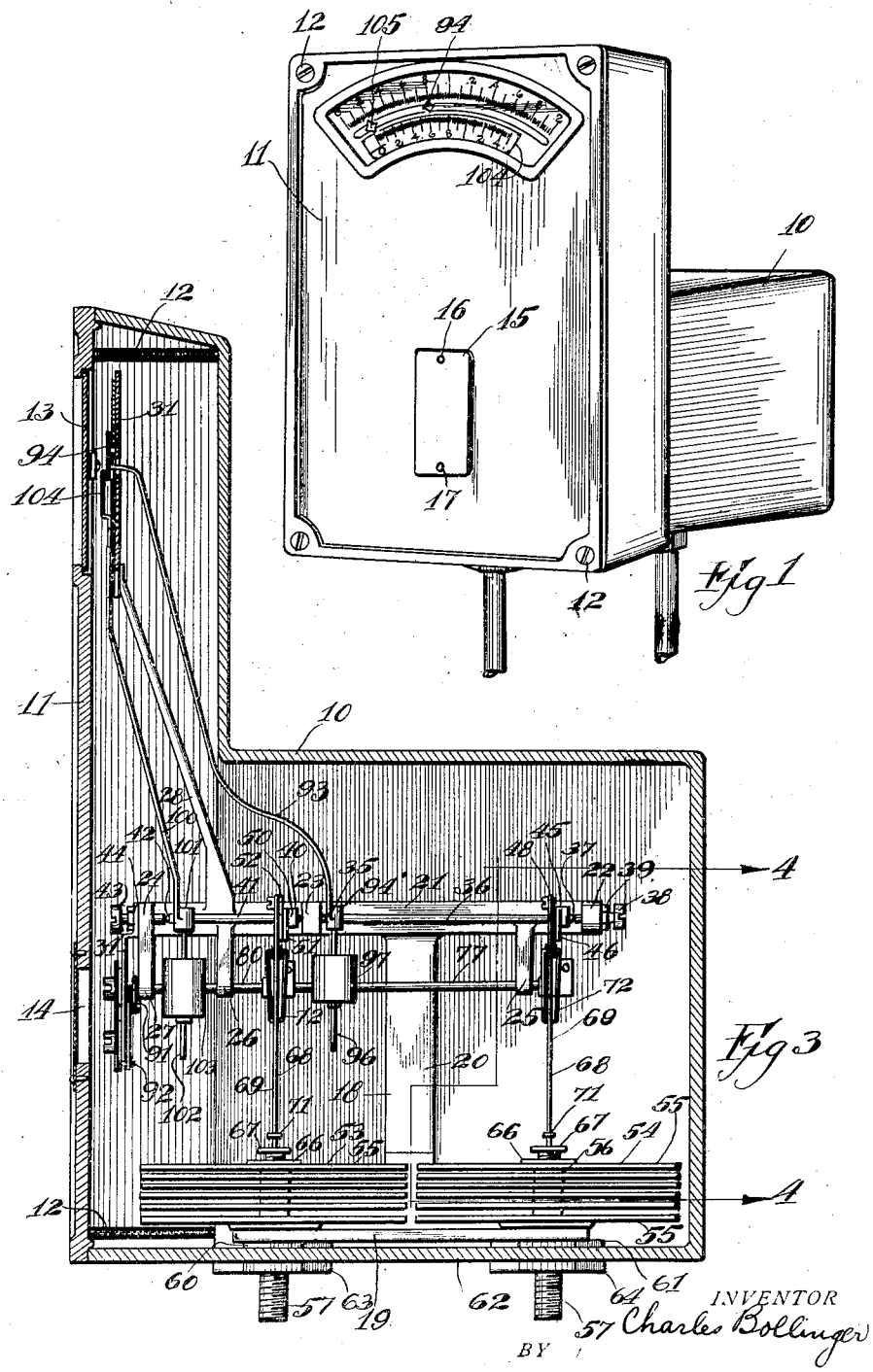

1,443,785

UNITED STATES PATENT OFFICE.

CHARLES BOLLINGER, OF CHICAGO, ILLINOIS.

DRAFT GAUGE.

Application filed September 11, 1919. Serial No. 323,132.

*To all whom it may concern:*

Be it known that I, CHARLES BOLLINGER, a citizen of the United States, residing at Chicago, in the county of Cook and State of Illinois, have invented new and useful Improvements in Draft Gauges, of which the following is a full, clear, concise, and exact description, reference being had to the accompanying drawing, forming a part of this specification.

This invention relates to draft gauges and more particularly to duplex differential indicating draft gauges whereby direct readings of the draft at different points, as well as a direct reading of the differential between the drafts at these points, are simultaneously indicated by the gauge.

The utility of a draft gauge, in view of the character and general intelligence of the individuals who ordinarily read these instruments, is dependent largely upon the ease with which they can be read to convey the desired information. Thus, elaborate instruments which require refined settings and the readings of which are of value merely as data for calculations to obtain the desired information are of little, if any, use or value to the average employee of the boiler room. Such instruments are consequently of no practical value as they are not used by the individual firing the boiler. Therefore, an instrument which will indicate directly to the fireman the draft reading at different points in the fire-box and also the difference in the drafts at these points without any mental effort on his part will overcome the principal difficulty encountered in the practical use and application of the information derived from draft gauges. It is, therefore, one of the objects of this invention to produce an improved form of indicating draft gauge which will give a direct reading of the draft at two different points in the fire-box, and also indicate directly the differential between the drafts at these two points.

Another object consists in the production of an improved and simplified indicating draft gauge provided with means adapted to indicate directly the frictional draft drop through the boiler proper.

A further object comprises the production of a simplified and compact construction of indicating draft gauge adapted to indicate directly the desired information, from which the proper firing of the boiler will be readily conveyed to a man of the general intelligence employed for this class of work. Other objects of the invention will become apparent from the accompanying illustrations, the following detailed description, and the appended claims.

The gauge or instrument constructed in accordance with the teachings of this invention is of primary importance in measuring the draft at various points in the fire-box of a boiler, but obviously can be used for other purposes within the scope and spirit of the invention as set out in the appended claims. For the purposes of description, however, a specific embodiment of the invention is illustrated in the accompanying drawings and in the following description for the sake of clearness and brevity this embodiment and its application to fire-boxes only will be described, its application for measuring drafts in any other device or devices being readily apparent to those skilled in the art from the description of this specific application thereof. In the accompanying drawings—

Fig. 1 illustrates a view in perspective of the complete instrument;

Fig. 2 is a front elevation of the instrument with the cover of the housing removed;

Fig. 3 is a vertical section of the instrument taken on the plane represented by line 3—3 of Fig. 2 looking in the direction of the arrows, and illustrates the operating mechanism of the instrument;

Fig. 4 is a section taken on the plane represented by line 4—4 of Fig. 3 looking in the direction of the arrows, and illustrates the mechanism utilized to actuate the indicating means of the instrument; and Fig. 5 is a vertical section taken on the plane represented by the line 5—5 of Fig. 2 looking in the direction of the arrows and illustrates the means utilized for adjusting the operation of the instrument.

As illustrated in the drawings, the instrument is enclosed in a housing preferably made of cast iron which comprises a base portion 10 and a cover 11, the cover 11 being secured to the base portion 10 by means of screws such as 12. The upper portion of the cover is fitted with an arcuated slot in which is positioned a transparent medium, preferably glass, 13, through which the indicating means, such as the scales and pointers of the instrument, are visible. The lower portion of the cover contains an aperture 14 over which is placed a plate 15, preferably secured to the cover by means of screws such as 16 and 17. This aperture 14 is provided so that access to the adjusting portions of the indicating means is permitted without the removal of the complete cover 11.

The operating mechanism of the instrument is all secured to a bracket 18 comprising the base portion 19, the upwardly extending arm 20, and the horizontal arm 21, to which are secured the forwardly extending bracket arms 22, 23, and 24, and the downwardly extending bracket arms 25, 26, and 27. The horizontal arm 21 of the bracket 18 also carries the upwardly extending arm 28 which divides at its upper end into the two arms 29 and 30, said arms 29 and 30 serving to carry a stationary scale 31, said scale being secured to the arms 29 and 30 preferably by screws such as 32. Secured to the front face of the bracket arm 24, by means of any suitable means such as rivets 33, is a downwardly extending plate 34 which carries the adjusting means for the indicating mechanism hereinafter to be described.

The bracket arm 23 has positioned in both faces thereof a conical bearing aperture, the conical bearing aperture in the back face of said arm receiving the conical end 35 of a rotatable rod 36, the conical end 37 of the other end of said rod being fitted in a conical bearing in the end of a screw 38 which is positioned in a threaded aperture of the bracket arm 22. The screw 38 is fitted with a lock-nut 39, whereby the screw 38 will be positively positioned when the rotatable rod 36 has been suitably mounted between the bearing in the bracket arm 23 and the end of the screw 38. The conical bearing in the other face of the bracket arm 23 receives the conical end 40 of a rotatable rod 41, the other conical end 42 of said rod being positioned in a conical bearing in the end of a screw 43 fitted in a threaded aperture of the bracket arm 24. The rotatable rod 41 is mounted in its bearings and held in position in a manner identical to that just described for the rod 36, the screw 43 being positively positioned by means of the lock-nut 44.

Rigidly secured to the rod 36 in any suitable manner, preferably by pressing it onto the rod, is a sleeve 45 fitted with a downwardly extending arm 46 to which is secured, by means of the screw 47, a lever-arm 48. (See Figs. 3 and 4.) The lever arm 48 is slotted at 49 to permit the passage therethrough of the rotatable rod 36 and also to permit movement of the lever-arm 48 on the arm 47, whereby adjustment of the length of the lever-arm may be obtained.

A similar sleeve 50 is likewise secured to the rod 41, said sleeve being fitted in a like manner with a downwardly extending arm 51 to which is secured in a like manner the lever-arm 52.

Secured to the base portion 19 of the bracket 18 are the suction operated members or devices 53 and 54. These suction operated members are exactly alike and well known to those skilled in the art, and consequently a very brief description of one of them will be sufficient to show the cooperative relation between the suction operated member and the rest of the mechanism.

The suction operated members consist of a plurality of discs such as 55, which are interconnected at the middle by the cylindrical tubes 56, the entire device being hermetically sealed except at its outlet 57 from the lower disc 55. The discs 55 are hollow and are spaced apart a distance equal to the thickness of the disc 55 by the cylindrical interconnecting members 56, whereby, when a suction is applied to the outlet 57, the discs will be drawn toward one another, thereby lowering the horizontal position of the top surface of the upper disc 55.

The outlet 57 is a threaded pipe or tube soldered to the lower disc 55 and serves as the means of connecting the suction members 53 and 54 to the base 19 of the bracket 18, this connection being accomplished by means of the nuts 60 and 61 respectively, as clearly indicated in Fig. 3.

The bracket 18, together with the associated suction devices 53 and 54 are rigidly attached to the base 62 of the housing by means of the nuts 63 and 64, which are screw-threaded under the outlet pipes 57 which project through apertures in the base 62 of the housing.

Secured to the upper disc 55 of each of the suction devices 53 and 54 is a disc such as 66 which has a central screw-threaded aperture adapted to receive a screw-threaded bolt such as 67. The head of the bolt is fitted with a screw-threaded aperture, which receives the lower screw-threaded end 68 of an interconnecting link 69 which unites the lever-arm 48 with the bolt 67 of one suction device 54 and the lever-arm 52 with the bolt 67 of the other suction device 53. (See Figs. 3 and 4.)

The links 68 and 69 and their method of interconnection between the lever-arm and the suction devices is identical, and consequently a description of one of said links, together with its interconnecting means and method of operation, will be sufficient to outline the method in which both of these links are connected into the apparatus. For the purpose of this description, reference is made to Figs. 4 and 5 from which it will be noted that the upper end of the link 69 is loosely connected to the lever-arm 48 by means of a screw such as 70, and also that adjustment of the length of the lever-arm 69 may be obtained by adjusting the height to which the bolt 67 is screwed into the disc 66 or the depth to which the threaded lower end 68 of the link 69 is threaded into the head of the bolt 67. When the proper adjustment is obtained, the position of the link 69 with respect to the bolt 67 is maintained by means of a lock-nut 71.

It will now be evident from the description thus far that when a suction is applied to the pipe 57 this suction will act on the discs 55 drawing said discs together, and this movement of the discs will in turn be transmitted to the connecting link 69 which will exert a downward pressure on the lever-arm 48, which, due to its rigid interconnection to the rotatable rod 36, will cause a rotation of said rod commensurate with the movement of the link 69.

For the purpose of controlling the effect of the draft on the discs 55 and consequently the effective pull of the draft on the link 69 and the lever-arm 48, a spring actuated means is interconnected with the link 69 which counteracts the effect of the draft through the discs on the said link 69. This counter-acting means is connected to the link 69 (see Fig. 4) by means of a loop link 72, secured to the link 69, through an aperture 73. The upper end of the loop-link is connected to the end 74 of a spiral spring 75 having a straight arm extension 76 protruding into the path of the link 72, so that the hook end 74 thereof will exert a direct upward pull on the link 69, due to the tension of the spiral spring 75.

The inner end of the spiral spring 75 is connected in any suitable way to a rod 77 rotatably secured to the bracket 18, as hereinafter to be described. In the preferred form of construction, as herein illustrated, the end of the spring is secured to the rod by means of a disc 78 pressed onto said rod, the said disc being fitted with a slot 79 into which a right angular bend 80 of the end of the spring 75 fits. Obviously, any other means for securing the spring to the rod could be utilized.

The interconnecting link 69 cooperating with the lever-arm 52 is equipped with a like counteracting spring operated means, the spring 76 in this case being rigidly secured in a like manner to a rotatable cylindrical tube 80. The tube 80 is rotatably mounted in bearings fitted in the downwardly extending arms 26 and 27 and carries at its forward end a transverse rod 81 which projects laterally back of the plate 34. The rod 77 is rotatably secured in a bearing in the downwardly extending arm 25 and extends through the tube 80 to the front end of the machine where it is fitted with a laterally extending arm 82, which likewise projects back of the plate 34.

It will now be evident that when the rod 82 is moved upwardly, the spiral spring 75 associated therewith will be placed under additional tension and through its laterally extending arm 76 this tension will be transmitted to the link 72, which will in turn react on the interconnecting link 69. Likewise, if the arm 81 rigidly connected to the tube 80 is moved upwardly the spiral spring 75 secured to the said tube will be similarly tensioned and said tension will be similarly transmitted to the interconnecting link 69 connected to the suction device 53.

To permit adjustment of the rods 81 and 82, and likewise to hold the spiral spring 75 associated with these rods, under tension an adjustment device is provided which is secured to the plate 34. This adjustment device can obviously take any one of many different forms but preferably consists of discs 83 and 84 snugly embedded in apertures fitted in the plate 34, each of said discs having integral therewith enlarged annular discs 85 and 86 respectively which position the discs 83 and 84 in the plate 34, so that the rear face of said discs will be substantially flush with the rear face of the plate 34. The discs 83 and 84 have secured thereto at the front end screw heads 87 and 88 respectively, said screw heads passing through and loosely fitting in apertures positioned in a plate 89 which is secured to the plate 34 by means of a screw such as 90. The apertures in the plate 90, which receive the screw heads 87 and 88, are of much smaller diameter than the annular discs 85 and 86, and consequently the plate 89 functions to hold the discs 83 and 84 in the position in the plate 34.

The discs 83 and 84 are each equipped (see Figs. 3 and 4) with outwardly extending pins 91 and 92 respectively, the pin 91 resting in the path of the arm 81 and holding said arm in position and its associated spiral spring 75 in tension. Likewise the pin 92 rests in the path of the arm 82 and holds the arm 82 in position and its associated spiral spring 85 in tension. The plate 34 and the associated mechanism just described are positioned under the plate 15, whereby, when the plate is removed, the screw heads 87 and 88 will be accessible from the front of the instrument.

It will now be evident from the foregoing description that when these screw heads are accessible the counteracting effect of the spring 75 can be adjusted from the front of the instrument by properly adjusting the position of these screw heads. Thus, inasmuch as the pins 91 and 92 are positioned at the outer peripheral surface of their associated discs 83 and 84, it will follow that as these discs are turned by means of their associated screw heads that these pins will move a distance substantially equal to the diameter of the discs for each 180° rotation and that this movement will be transmitted to the associated lateral arms 81 and 82. This movement of the arms 81 and 82, if in an upwardly direction, will obviously place the spiral spring 75 under additional tension and will have the opposite effect when the arms are moved in a downwardly direction.

Secured to the rod 36 in any suitable way, preferably by pressing it onto the said rod, is an arm 93 which carries at its end an embossing 94' apertured to receive the rod 36. The arm 93 at its upper end is equipped with the indicator 94 (see Fig. 1), which indicator rides over the front surface of the stationary scale 31, the arm 93 projecting through an aperture 95 cut in the scale 31. Extending downwardly from the embossing 94 is a threaded pin 96 which carries a counterweighting balance 97, the purpose of which is well known to those skilled in the art.

Secured to the rotatable rod 41 are upwardly extending scale supporting arms 98 and 99 which converge at their lower end into a single piece 100 (see Fig. 1) which is fitted with an embossing 101 (see Fig. 3) which is forced preferably onto the rod 41. The embossing 101 carries a downwardly extending threaded pin 102 fitted with a counterweighting balance 103 identical to that furnished for the arm 93. The upwardly extending scale supporting arms 98 and 99 carry a movable scale 104 which is positioned in front of the stationary scale 31 and below the calibrations on said stationary scale. The movable scale carries at its left end over the zero calibration an indicating pointer 105 which cooperates with the scale calibrations on the stationary scale 31.

In connecting up the instrument the point of maximum draft is connected to the pipe 57 associated with the indicating pointer 94 and the point of minimum draft is connected to the pipe 57 associated with the movable scale 104. When the instrument is thus connected and readings are taken, the relative positions of the indicating pointers and the movable scale are indicated in Fig. 2. When thus positioned it will be noted that the indicating pointer 95 will give a reading on both the stationary scale 31 and the movable scale 104; whereas, the indicating pointer 105 associated with the movable scale 104 will indicate a reading on the stationary scale 31. These readings will indicate directly from the scale the greater draft at the one point in the fire-box by the indicating pointer 94 and the smaller draft by the indicating pointer 105 of the combined movable scale and indicating pointer 104. The reading by the indicator 94 on the movable scale 104 will indicate directly the differential between the large and small draft readings. Thus for the arbitrary setting of the instrument illustrated in Fig. 2, the maximum reading is eight-tenths (.8), the minimum draft reading is two-tenths (.2), and the differential between these readings, as shown by the indicator 94 on the movable scale, is six-tenths (.6).

A very brief description of the operation of the instrument is as follows:

The instrument is ordinarily positioned in some convenient place in the boiler room from where the pipes 57 are carried by suitable pipe extensions to the particular points in the fire-box of which direct draft readings are to be obtained. Usually these direct draft readings are obtained for a point directly in the center of the fire-box and one over the breeching or the rear end of the fire-box. When readings of this type are desired, the outlet or pipe 57 associated with the indicating pointer 94 is positioned over the breeching and the outlet 57 associated with the indicating pointer 105 is positioned over the center of the fire-box. When the instrument is thus connected, it will be evident that the suction created by the draft at these two points will be communicated to the suction operated means 53 and 54. The suction operated means 53 will react through the interconnecting link 69 on the lever-arm 52, which will rotate the rod 41, said rod carrying with it the combined movable scale 104 and the associated indicating pointer 105. In a like manner the draft will react on the suction operated means 54, which, through its associated interconnecting link 69 and the lever-arm 48, will rotate the rod 36 which will carry with it the indicating pointer 105 over the stationary scale 31. When the drafts at these two points in the fire-box have operated upon their respective suction operating devices, the relative setting of the pointers 94 and 105 and the movable scale 104 will be as indicated in Fig. 2.

For the purpose of adjusting and properly calibrating the intrument the adjustments between the interconnecting link 69 and the suction devices 53 and 54 and the spiral spring 75, which operate to counteract the effect of the suction operated devices, will be utilized as hereinbefore described.

It will now be evident from the foregoing description that in using a draft gauge or instrument constructed in accordance with the teachings of this invention that direct readings are obtained which are a measure of the force of the draft at two different points, and also a differential indication of the difference between the drafts at these two points. All of these readings are simultaneously procured.

It will also be evident that with an instrument of this type the fireman will be constantly apprised of the draft conditions in the fire-box and this information will be indicated to the fireman directly from the readings of the instrument without any mental calculations whatsoever on his part. The instrument, therefore, constitutes a simplified device which gives to the fireman the information desired, without any effort on his part, for regulating the performance of the fire in the fire-box, and inasmuch as this information can be obtained by the fireman without any effort on his part the gauge becomes of practical value because this information will consequently be utilized.

Obviously, the invention is not limited to the specific embodiment thereof herein illustrated and described, but is capable of many variations and other applications without departing from its spirit and scope set forth in the following claims.

Having thus described my invention, what I claim is new and desire to secure by Letters Patent is:

1. In a device of the character described, in combination, a stationary scale, a combined movable scale and indicating pointer, an indicating pointer, two suction operated means one individual to said indicating pointer and the other to said combined scale and indicating pointer, means to interconnect said suction operated means to different points, means mechanically interconnecting said suction operated means and said combined scale and pointer, means mechanically interconnecting said suction operated means and said indicating pointer, said indicating pointer and combined movable scale and indicating pointer, when actuated by said suction operated means cooperating with said stationary scale to give a direct reading of the draft at different points, and the differential between the drafts at these points, and means for adjusting the turning effort exerted by said suction operated means on said indicating pointer and said combined scale and indicating pointer.

2. In a device of the character described, in combination, a stationary scale, a combined movable scale and indicating pointer, means to rotate said combined scale and indicating pointer, an indicating pointer, two means to rotate said indicating pointer, two suction operated means one individual to said combined movable scale and the other indicating pointer, and to said indicating pointer, means to interconnect said suction operated means to different points, means mechanically interconnecting said suction operated means and said combined scale and indicating pointer, means to mechanically interconnect said suction operated means and said indicating pointer, spring operated means adapted to counteract the turning effort of said suction operated means on said combined scale and indicating pointer and on said indicating pointer, and adjusting means whereby the counteracting effect of said spring operated means can be controlled, said indicating pointer and combined movable scale and indicating pointer when actuated by said suction operated means cooperating with said scale to give a direct reading of the draft at said different points and the differential between the drafts at these points.

3. In a device of the character described, in combination, a stationary scale, a combined movable scale and indicating pointer, means to rotatably support the same, an indicating pointer, means to rotatably support the same, suction operated means, means to interconnect said suction operated means to different points, means mechanically interconnecting said suction operated means and said combined scale and indicating pointer, means mechanically interconnecting said suction operated means and said indicating pointer, means for adjusting the effective movement of said suction operated means for a given amount of suction, and means for adjusting the effective movement of said indicating means for a given amount of movement in said suction operated means, said indicating pointer and combined scale and indicating pointer, when actuated by said suction operated means, cooperating with said stationary scale to give a direct reading of the draft at said different points and the differential between the draft at these points.

4. In a device of the character described, in combination, a stationary scale, a combined movable scale and indicating pointer, means to rotatably support the same, an indicating pointer, means to rotatably support the same, suction operated means individual to each said combined movable scale and said indicating pointer, a link interconnecting each said suction operated means to said rotatable means, and means associated with said link whereby the effect of the movement of said suction operated means on said rotatable means can be adjusted.

5. In a device of the character described, in combination, a stationary scale, a combined movable scale and indicating pointer, means to rotatably support the same, an indicating pointer, means to rotatably support the same, suction operated means individual to each said combined movable scale and said indicating pointer, a link interconnecting each said suction operated means to said rotatable means, means associated with said link whereby the effect of the movement of said suction operated means on said rotatable means can be adjusted, spring operated means adapted to counteract the turning effort of said suction operated means on said combined scale and pointer and said indicator pointer, and means whereby the counteraction of said spring operated means can be adjusted.

6. In a device of the character described, in combination, a stationary scale, a combined movable scale and indicating pointer, means to rotatably support the same, an indicating pointer, means to rotatably support the same, suction operated means individual to each said combined movable scale and said indicating pointer, a link interconnecting each suction operated means to said rotatable means, means associated with said link whereby the effect of the movement of said suction operated means on said rotatable means can be adjusted, spring operated means adapted to counteract the turning effort of said suction operated means on said combined scale and pointer and said indicator pointer, means whereby the counteracting of said spring operated means can be adjusted, a housing for enclosing said device, and an aperture in said housing through which the said last mentioned adjusting means can be operated.

7. In a device of the character described, in combination, a plurality of suction operated means, a plurality of indicating means, scales cooperating with said indicating means, mechanisms interconnecting said suction operated means and said indicating means whereby the suction exerted on each of said suction operated means and the differential between the suction exerted on said suction operated means is directly indicated on said scales, means for adjusting the effective movement of said indicating means for a given amount of movement of said suction operated means, a housing for completely enclosing said device, and an aperture in said housing through which the adjusting means controlling the effective movement of said indicating means can be operated.

In witness whereof, I have hereunto subscribed my name.

CHARLES BOLLINGER.